United States Patent
Sharma

(12) 
(10) Patent No.: US 6,924,793 B2
(45) Date of Patent: Aug. 2, 2005

(54) MULTI-STYLI INPUT DEVICE AND METHOD OF IMPLEMENTATION

(75) Inventor: Manish Sharma, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 10/198,010

(22) Filed: Jul. 16, 2002

(65) Prior Publication Data

US 2004/0012574 A1 Jan. 22, 2004

(51) Int. Cl.$^7$ .................................................. G09G 5/00
(52) U.S. Cl. ................................. 345/179; 178/19.01
(58) Field of Search .............................. 345/156–179, 345/180–183; 178/18.01–19.07; 401/6–8

(56) References Cited

U.S. PATENT DOCUMENTS

| 4,414,537 | A | * | 11/1983 | Grimes | 341/20 |
|---|---|---|---|---|---|
| 4,954,817 | A | * | 9/1990 | Levine | 345/179 |
| 5,444,462 | A | | 8/1995 | Wambach | |
| 5,554,828 | A | | 9/1996 | Primm | |
| 5,576,502 | A | | 11/1996 | Fukishima et al. | |
| 5,581,484 | A | | 12/1996 | Prince | |
| 5,627,348 | A | | 5/1997 | Berkson et al. | |
| 5,706,026 | A | | 1/1998 | Kent et al. | |
| 5,734,130 | A | | 3/1998 | Baker | |
| 5,913,820 | A | | 6/1999 | Bladen et al. | |
| 6,232,960 | B1 | * | 5/2001 | Goldman | 345/168 |
| 6,249,277 | B1 | * | 6/2001 | Varveris | 345/179 |
| 6,380,923 | B1 | * | 4/2002 | Fukumoto et al. | 345/156 |
| 2001/0053306 | A1 | * | 12/2001 | Schneider | 401/8 |
| 2002/0034412 | A1 | * | 3/2002 | Lee | 401/7 |

* cited by examiner

Primary Examiner—Regina Liang

(57) ABSTRACT

A computer input system is disclosed that utilizes a glove-type multiple styli device that is mapped for operation based on their finger position. The input system can further include a digitizing tablet, such as one using MRAM cells.

21 Claims, 4 Drawing Sheets

MULTI-STYLI INPUT DEVICE AND METHOD OF IMPLEMENTATION

One other application is described in commonly assigned and co-pending U.S. patent application Ser. No. 10/038,485, entitled "STYLUS BASED INPUT DEVICES UTILIZING A MAGNETIC RANDOM ACCESS MEMORY ARRAY," the disclosure of which is hereby incorporated herein by reference for all purposes.

BACKGROUND OF THE INVENTION

The present invention relates generally to digitizing input devices and, more particularly, the present invention relates to the development of a multi-styli pointing/input device operable with a digitizing array within a digitizer apparatus.

Digitizer systems are well known to those skilled in the art. Typically, an electromagnetic array, or other type of system, is responsive to a stylus used by a user to enter data directly upon a grid and to control various computer functions by writing, sketching, or pointing the stylus against the digitizer array. Some embodiments locate the digitizer directly on the monitor; other embodiments separate the two devices. Usually, separate digitizers are utilized where a large work surface is needed compared to the size of the display device such as a monitor screen. Integrated digitizer and display devices are utilized where portability and size are important. As such, various types of computer systems utilize stylus-based technologies and may include portable systems, desktop systems, transportable, or terminal-based systems.

The integrated digitizer-display systems are integrated only in the sense that they are coplanar and are fitted together in a common device. They are not integrated in that a signal processor is required to convert the signals generated by the digitizer into display signals compatible with the display. Thus, additional circuitry and complexity are involved in even the simplest of digitizer-display systems that are integrated for direct input on the same display surface where the digitizer is located.

Several types of stylus input digitizing devices exist in the prior art. One type involves direct contact of a stylus tip against a capacitive-resistive array. As the stylus tip, such as a metal tip or even a user's finger, is placed proximate a selected area of a digitizing pad, a capacitive-resistive circuit within the pad detects the placement of the stylus and computes its location according to well-known mathematical formulas of a grid-based array. Typically, the capacitive-resistive array is used over small areas in devices such as a portable digitizer screen or finger-sensitive mouse pad.

A second prior art system utilizes an electromagnetic digitizer that interacts with a magnetic-tipped stylus or electromagnetic field-generating stylus in entering data and performing actions desired by the user. The tip of the stylus interacts with the field on the digitizer to convey information and data from the user. Typically a grid of intersecting lines produces a field that can be either actively or passively modified by the field generated by the stylus. Crossing lines can sense the field of the tip to generate a responsive signal, or can produce a field altered by the stylus during interaction.

Another embodiment is that of a stylus having an RF transmitter to send signals to the digitizing array, which then detects the transmitted signals utilizing receiving circuits in the array. Alternatively, the pad locations may be coated and the RF signal generated by the stylus interact with the array and are received at a receiver within the stylus itself.

Further, an alternative embodiment may incorporate a light source, such as visible or infrared light placed within the tip of the stylus to reflect off the pad. The stylus uses an imaging device, such as a CCD camera, to detect optically the return signal, and hence the location where the stylus interacts with the digitizer. The system then processes and decodes the received signal and location in order to determine the appropriate information.

Each of these systems has had some success; however, each has limitations that make them difficult or undesirable to use. For example, the direct contact technology is subject to scratches and wear during normal operation and has low durability compared to other technologies.

The wire-grid electromagnetic technology is expensive to implement and requires many individual wires for greater resolution. Additionally, the electromagnetic digitizers typically require a planar magnetic material behind the wire-grid sensor to shield the system from stray magnetic effects. In portable uses, this makes the technology for the system implementing such technology heavier than necessary. In the light-based systems, the stylus needs to be corded to the digitizer array and the need for sophisticated electronics for producing the light source as well as the CCD camera must be incorporated and expanded to achieve such a stylus.

Stylus-based input devices have also been implemented to incorporate multiple styli in the same device. For example, glove-type input devices have been developed that are placed on a user's hand in a glove form with two or more fingers having an input device associated therewith. The different styli utilize a different signal to differentiate each other. Thus, where there are 5 input devices, one for each finger and the thumb, five different signals must be generated and managed. Should a user use two gloves, each with five input styli, then 10 different signals must be generated and managed.

Further, the multi-styli input devices have utilized very complex routines to observe the movement of the user's fingers, such as a particular joint and the distance the finger is moved, for providing data input. Additional electronics and transducers are necessary to measure each joint of each finger as well as to monitor the distance traveled by the user's fingers. As such, this device is expensive and complicated to implement.

Accordingly, what is needed is an improved multi-styli input device and digitizing apparatus utilizing the input device that has greater resolution than the prior art systems, is easier to manufacture, is less complex when implemented within a computer system, and is more durable during actual use.

SUMMARY OF THE INVENTION

According to the present invention, an input system for use on a user's hand is disclosed that includes one or more stylus, each placed on a separate finger of the user's hand, and location control logic and communications logic. In addition, each stylus can generate an output signal based on a user input action. The location control logic is coupled to the styli and operates to identify each stylus based on the finger position assigned on the user's hand relative to the other fingers of the user's hand. The communications logic, which is coupled to the location control logic, sends the signals generated by the styli to a computer system for processing or display. Additional styli are possible and a second hand may also be mapped for use. A digitizer tablet can be provided to interact with the input stylus and a touch screen system can be achieved using a screen integrated with the digitizer tablet.

BRIEF DESCRIPTION OF THE DRAWINGS

Features and advantages of the present invention will become apparent to those skilled in the art from the following description with reference to the drawings, in which.

DETAILED DESCRIPTION OF SPECIFIC EMBODIMENTS

For simplicity and illustrative purposes, the principles of the present invention are described by referring mainly to exemplary embodiments thereof. One of ordinary skill in the art, however, would readily recognize that the same principles are equally applicable to many types of digitizer systems with displays.

Figure 1:
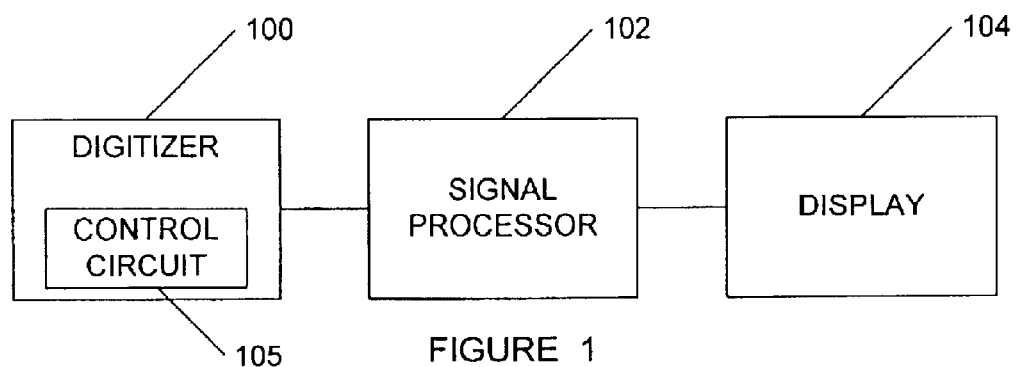
FIG. 1 illustrates a schematic diagram of a digitizing system with display unit in accordance with the present invention.

A digitizing apparatus that connects to a display system in accordance with the present invention is illustrated in FIG. 1. A digitizer 100 is disclosed that utilizes an array of magnetic random access memory (MRAM) cells to function as a stylus-based input device. The input device is not limited to stylus-based systems, but also includes other input means such as pointing devices, digit input device, such as a finger or stylus, or a mouse. Other types of digitizer systems are also possible and the invention is not limited to merely using an MRAM-based digitizer. Digitizer 100 couples to a signal processor 102, which further connects to a display system 104. Signal processor 102 receives signals from the digitizer 100 and processes them for display on video display 104. Digitizer 100 further includes control logic 105 that is utilized to control digitizer 100 during operations such as array read, array write, and array clear, which are well known to those skilled in the art.

Figure 2:
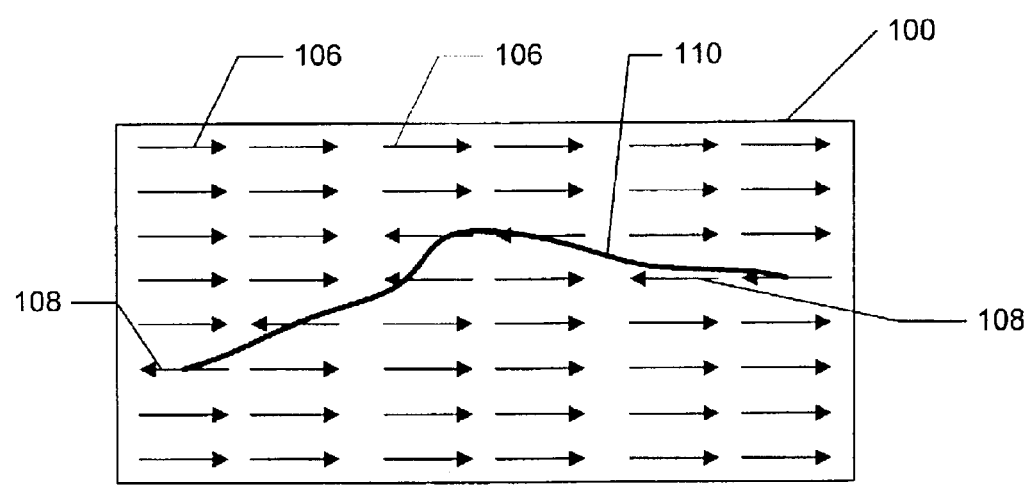
FIG. 2 illustrates a schematic diagram of a stylus interaction leaving a trace on a magnetic random access memory (MRAM) digitizing pad of that from FIG. 1.

Digitizer 100 is shown in further detail in FIG. 2, which illustrates a trace of at least one stylus tip over the surface of digitizer 100. The digitizer 100 is composed of an array of memory cells 106. Each memory cell has at least two state possibilities based on the orientation of a magnetic bit found within the cell 108. As the stylus interacts with the surface of digitizer 100 a trace occurs. The trace is formed as the bit within the cell is reoriented, causing the state of memory cell(s) 106 to change as shown in cell 108. The trace 110 illustrates a path taken by the stylus. An electrical signal is then applied to the array of cells 106 as a read signal to generate a read output of those cells modified by the bit change. The read output signal, which is a modified electric signal caused by the changed bit positions, is then sent to the signal processor 102 of FIG. 1 where it is processed according to the pattern traced by the user. The trace 110 is then displayed on display unit 104.

MRAM cells have emerged as an alternative to long-term storage and the MRAM cells have similar properties of fast access of semiconductor memory. They can serve as long-term storage devices since they have the ability to store information indefinitely. An MRAM cell stores a bit of information based on the magnetic orientation of magnetization placed in a patterned thin-film magnetic element. This magnetic film is designed so that it has two stable and distinct magnetic states. The stable magnetic states define a binary one (1) or a binary zero (0). Although the digital information is stored in a thin magnetic film, many layers of very carefully controlled magnetic and dielectric layers are associated with a memory element.

The magnetic state of a selected memory cell 106 may be changed by applying currents to a word line (not shown) and a bit line (not shown) crossing the selected memory cell 106. The currents produce two orthogonal magnetic fields that, when combined, will switch the magnetic orientation of the selected memory cell 100 between the aligned and mis-aligned states, also known as the parallel and anti-parallel states, respectively. Other unselected memory cells receive only a magnetic field from either the word line or the bit line crossing the unselected memory cells. The single field is not strong enough to change the magnetic orientation of the unselected cells, so they retain their magnetic orientation. When a stylus having a magnetic tip is placed proximate the cells, a sufficient field is then applied to cause the magnetic state of the cell to change. This results in a change of orientation between the parallel and the anti-parallel states.

One advantage of utilizing MRAM cells is that they hold their orientation indefinitely without any external force applied to them. This means that no electric field or electric current must be applied to the MRAM cell in order to maintain the magnetization orientation of its magnetic bit. Thus, should the device be turned off, the orientation last impressed upon the cell will be maintained indefinitely. Once the system is reenergized, a readout operation would signal that the state has been maintained and thus an orientation is preserved. This allows a signal to be sent that would signify to the signal processor and therefore displayed on the display device the previous drawing made by the user on the digitizer array before the power was turned off.

Figure 4:
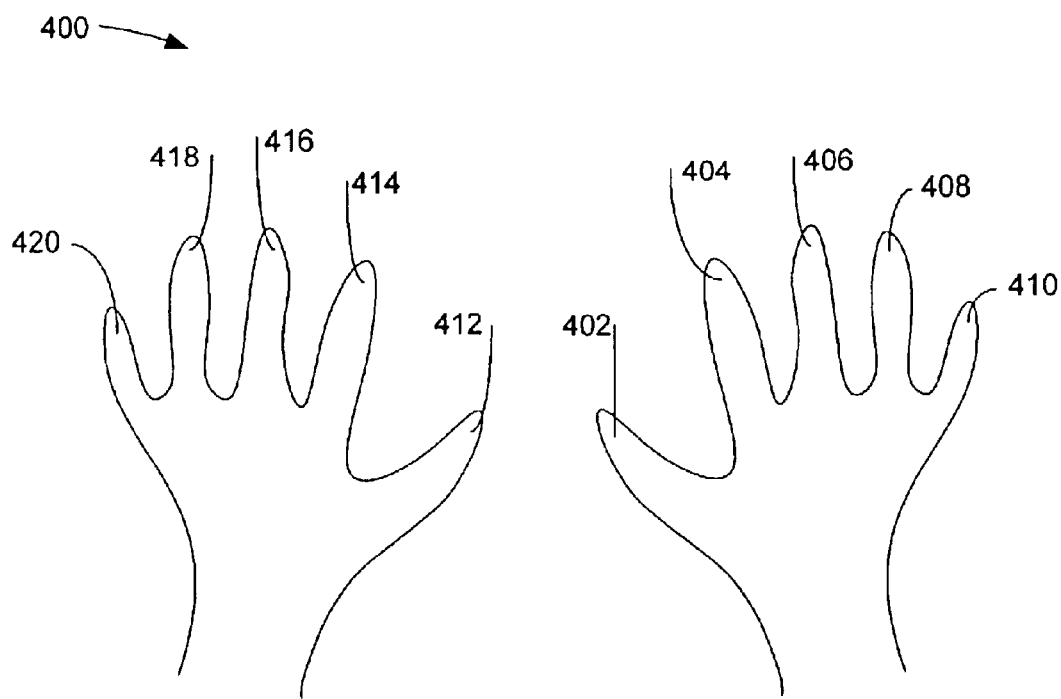
FIG. 4 illustrates a schematic representation of an embodiment of a pair of multi-styli input devices, in accordance with the present invention.

The system utilizes an input device 400, as illustrated in FIG. 4, that is glove-like and includes a plurality of styli 402–420, typically one for each finger and thumb of the user's hand. Both right and left gloves are illustrated and may be utilized separately or in tandem. The input device 400 fits on the user's hand like a glove and allows greater dexterity over other, non-hand integrated, input devices such as a pen stylus or mouse-type input device. Each stylus 402–420 further includes a magnetic tip in one embodiment that can be scanned over the digitizer array. Beneath the surface of the pad lies an array of MRAM cells very similar to the MRAM architecture previously described. As the stylus moves, a magnetic field is generated by the magnet within the tip of the stylus to cause bits to flip in the path of the stylus movement and leaves a trace as shown in FIG. 2. The MRAM array is continuously read and scanned for changes in the bit patterns recorded in it. As the stylus 402–420 moves across the array, the trace changes the pattern and its path is displayed on the display.

Figure 3:
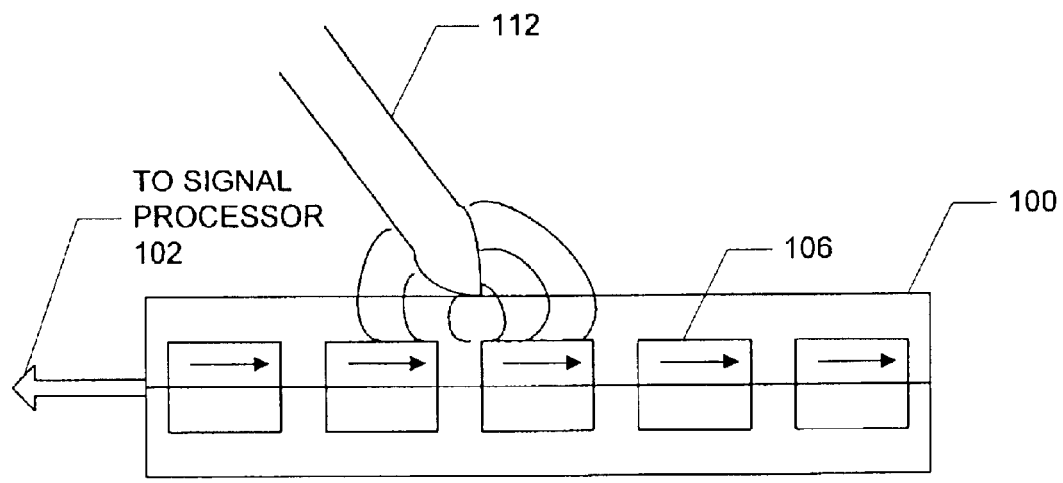
FIG. 3 depicts a cross-sectional side view of the stylus interacting with the digitizer tablet in accordance with the tablet of FIG. 2.

In one embodiment, the stylus tip as shown in FIG. 3 comprises a permanent magnet that produces a known field. The magnet may be placed in the tip used to interact with the tablet or the stylus may be coated with a magnetic material that generates a magnetic field that can affect the MRAM memory cells. Supporting drive electronics are found within the digitizer and are well known to those skilled in the art. Initially, the drive electronics set all bits in the array of memory cells in a first direction. As the stylus tip moves across the array, the magnetic field induces a bit change in a direction opposite of their original alignment. The drive electronics periodically may reset all bits to their original orientation or when directed to by the user.

In an alternative embodiment, the tip of stylus 112 may produce a varying magnetic field using a current carrying coil. Since the current may be altered by changing its direction and its strength, the affected bits within the memory cells will be placed in a unique pattern as they have been changed both in space and in time in response to the current pattern selected by the user with the stylus. The current pattern may be varied by the user pressing the tip downward against the array, which may signify a button-press operation such as that on a mouse-type pointing device, or selecting one or more buttons on the stylus, which may signify different key clicks such as those in a mouse being a right, left, or middle button selection. In yet another embodiment, the varying current pattern may also signify changing colors, which will be described in greater detail below.

Since the MRAM cells operate independently of the other cells and the stylus, utilization of more than one stylus can be done easily. Each stylus is designed to operate independently of the other as the cells they affect also operate independently of one another. For example, a multi-fingered input system may be implemented. The multi-fingered input device 400 is further designed to acknowledge that each stylus, due to its placement on the user's hand, can only operate within a limited sphere as shown in FIG. 5.

Figure 5:
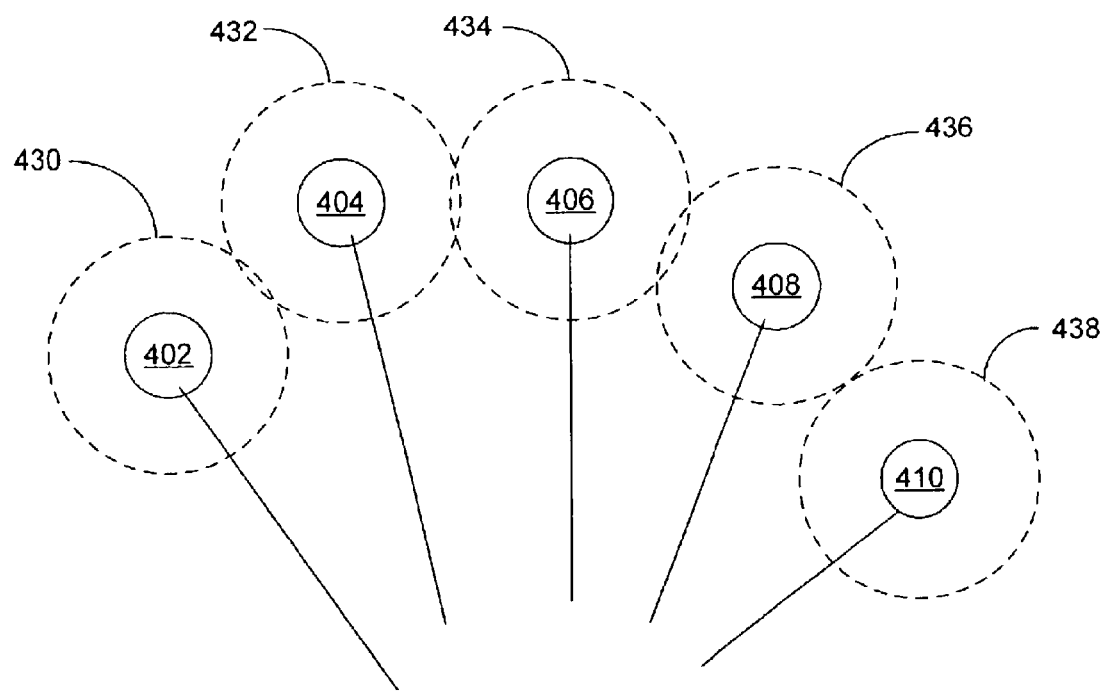
FIG. 5 illustrates the mapping of each stylus for one of the multi-styli input devices of FIG. 4.

FIG. 5 depicts a single glove having five input styli 402–410. Each stylus 402–410 is further coupled to signal processor 102, which is programmed to operate as a location control logic system and a communications logic system. Separate logic devices are also possible, but an integrated device to perform both functions reduces parts and cost.

Each stylus 402–410 has a defined sphere of operation as shown in spheres 430–438, respectively. Each sphere 430–438 may slightly overlap a sphere of an adjoining stylus, but may not overlap with more distant stylus(i). For example, spheres 430 and 432 may overlap some, but spheres 430 and 434 may not, even though spheres 432 and 434 may overlap. The spheres of operation are defined or mapped to each stylus. This is possible because fingers on the same hand cannot move too far from each other and can only be so far apart from one another. Rules of operation then follow the natural limitations of a user's hand and can be coded as constraints in the location control logic. Each finger is thereby limited to its own sphere of influence relative to one another on the same glove. The sphere of operation, which is location dependent, is managed by the location control logic portion of signal processor 102. The communications logic enables signals from input device 400 to be sent to signal processor 102. In one embodiment, signal processor 102 is a computer system that serves as control logic for the input stylus system. The computer system typically includes, but is not limited to, having a central processing unit, user input means, and output means.

The mapping can take into consideration an average finger size of a user, or be programmed for the specific hand and finger size of the user. The rules can insist that once or more removed fingers will not cross each other, thus preventing their spheres of operation from overlapping. Further, when both hands have input device gloves on, it is preferred that the hands do not cross, so the spheres of operation on one glove will not interfere with the spheres of operation on the other glove. Further, it will be inherent that the user will most often begin input with the index finger of either hand, which will serve as a point of reference with respect to any activity performed with the other digits. Other possible configurations that can be implemented and are contemplated as embodiments of the present invention include the following. One embodiment includes the use of a single stylus pointing on a board where the constraint-based location control logic considers the stylus as a single index finger independent of which finger is actually there. Another embodiment includes a single stylus placed on each hand such that two pointing devices are provided to point at two different points. In this configuration the independent pointing devices are treated as as two independent index fingers. Another embodiment allows for separate pointing devices from separate individuals, each with a stylus assigned to one hand and pointing on a common board. This configuration is the same as when one user places a pointing device on each hand.

The magnetic cell array is sensitive to magnetic fields. The strength of the magnetic field produced by the stylus is selected to be sufficient enough to be detected by the array without direct contact. This allows a covering to be placed on the top surface of MRAM cells such that the pad may be written upon directly without fear of scratching or damaging the screen or array surface below. This provides a touch screen video display utilizing the input system as embodied in the present invention.

Figure 6:
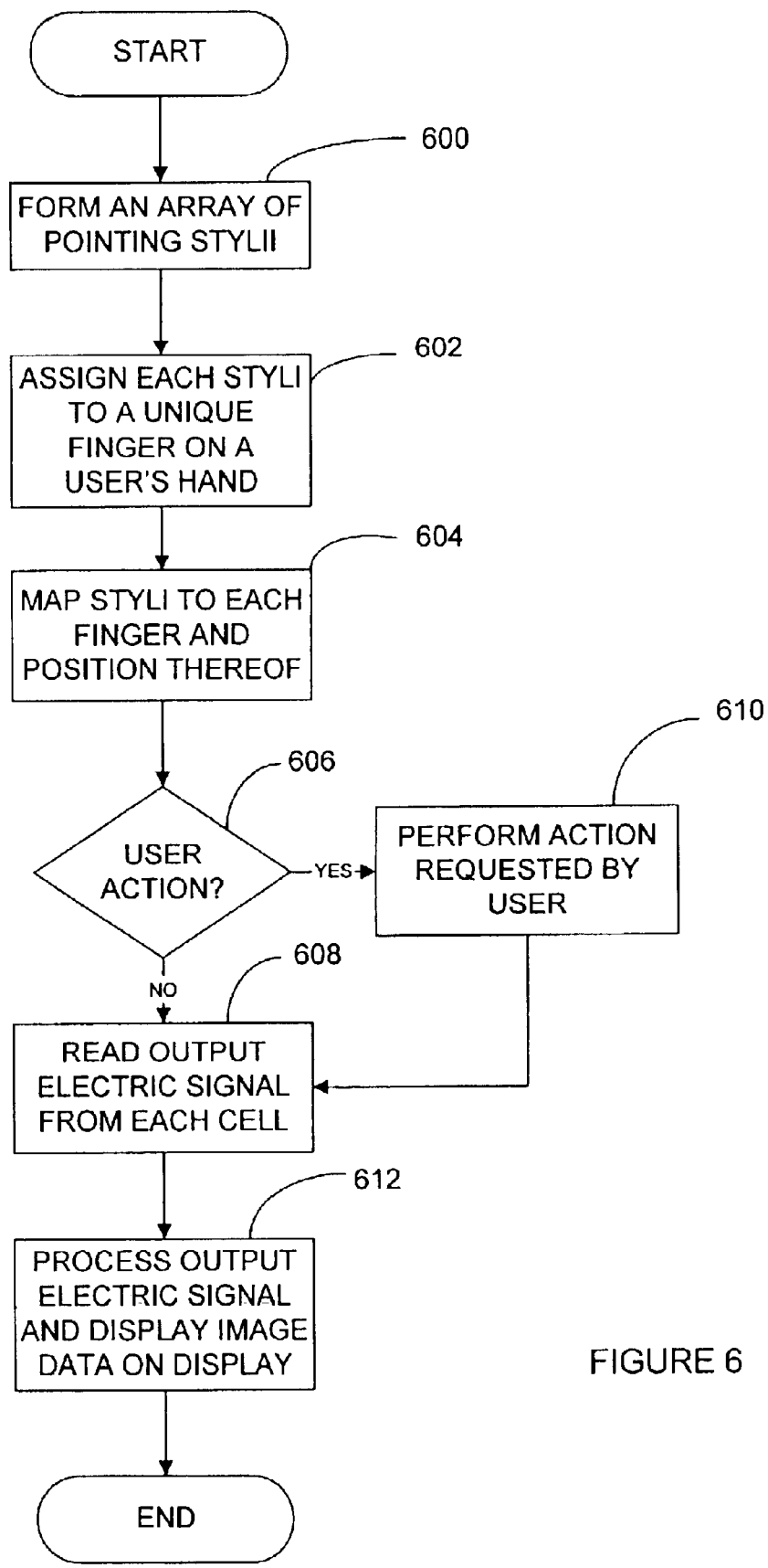
FIG. 6 is a diagram of the steps utilized to map each stylus for use and then managing input data in accordance with the present invention.

FIG. 6 illustrates a flow diagram of a method of implementing and using the multi-styli pointing device 400 of FIGS. 4 and 5, and as applied to the use of the MRAM digitizer 100 of FIGS. 1–3. Initially, as shown in block 600, a plurality of pointing styli 402–410 (412–420) is defined for use with the digitizer. Each memory cell utilized with the MRAM digitizer 100 includes additional control logic to identify particular locations on the digitizer panel where any stylus interacts. The detection of the stylus interaction of changing the bit orientation within selected cells enables a signal to be sent to a signal processing unit, which then causes the trace to be displayed on a display apparatus in accordance with the present invention.

Next, the user, through the placement of the styli on the user's hand and as shown in block 602, defines which stylus is associated with which finger on the hand. Once the styli are assigned to a unique finger, the mapping schema, typically programmed within signal processor 102 and as shown in block 604, maps each stylus to the assigned finger and defines the sphere of operation for that stylus based on its finger assignment.

The input device 400 is now ready to be implemented with digitizer system 100. As the user applies the multi-styli to the digitizer system, the memory cells are altered and the system applies a read electric signal to the array to determine the user's action, as shown in block 606. If the action is merely to draw upon the digitizer surface, thereby altering the state of affected memory cells, the system, as shown in block 608, reads the output signal from each stylus based on the mapping previously defined. This electric signal, as modified by the affected cells, is forwarded to the signal processor where it is processed so as to identify those cells that have been modified. Once the cells are identified, pixels on the screen that correspond to the cell location on the digitizer are then activated to reproduce the trace on the display as shown in block 612. Each stylus may be viewed distinctly by assigning a particular color for display to distinguish different traces one from another.

If the system detects that the user has performed a desired action, the system, as shown in block 610, performs the action requested by the user. Typically, these actions are similar to the action the user may take with a pointing device such as a mouse or roller ball. The actions can include a right or left mouse click or a center mouse click. The execution of a program or opening of a web page can also be conveniently located within an operating range of the stylus as implemented by the user.

Although the glove-type input device has been shown to operate with an MRAM digitizer system, it need not be so limited. In fact, the input device of the present invention can be applied to other, non-MRAM based digitizer displays.

The input device of the present invention avoids several of the problems that are found in the prior art. For example, the multi-styli input device does not need individually coded styli, as is required in the prior art. This eliminates the need for additional signal generation and processing of such multiple signals. Further, the expense incurred in such multi-signal multi-styli input devices is reduced in the present invention.

The multi-styli input device provides for an intelligent system that recognizes via mapping each stylus and the finger to which it is mated. As the user moves his or her hand, the movements of the fingers allow the system to intuitively limit or restrain the user's hand actions. For example, the user intuitively will not cross his or her fingers or hands, if two glove-type multi-styli input devices are uses, one on each hand. Thus, the location of the stylus area of interaction is constrained by its placement relative to the other fingers or styli.

An alternative embodiment of the present invention contemplates display panel 104 being physically mated with digitizing MRAM array 100. Display 104 is placed over digitizer 100 such that as the user traces one or more of the styli across the surface of display 104, the magnetic field interacts with the array 100 below and causes a trace to be drawn exactly where the stylus interacts with the display panel or a function to be performed as invoked by a particular stylus. Signals are sent to the signal processor 102 and then sent to the display panel 104 for display. This has the advantage of integrating a digitizing apparatus 100 with a display apparatus 104 such as are utilized on laptop computers and personal digital assistances (PDA) devices and the like.

Another embodiment of the invention mates a display apparatus 104 with a digitizer apparatus 100 such that the digitizer, utilizing the MRAM cells, actively controls the display pixels found within a display panel 104. The display panel used in this type of system typically utilizes transistors such as in an active matrix and is well known to those skilled in the art. The MRAM cells in the array are mated with a selected transistor to activate the pixel within the display in accordance with the present invention. This allows the user to view the traces on the digitizer pad as if the user were using a marker, such as a pen or pencil, directly on paper.

The array can comprise anywhere from just a few pixels in the X and Y directions to as large as is necessary to supply a display apparatus of conventional size. Such a display would have over a thousand lines in both the X and the Y dimensions.

Thus, it has been demonstrated that a digitizing device utilizing an array of MRAM cells may be incorporated to interact with a display device and that the digitizer device may actually be combined with the display using thin-film transistor cells so the memory cells directly activate the pixels within an active matrix display. The result is a digitizer-display that needs little, if any, signal processing logic as is required in other digitizer-display units. Thus, as the user writes a trace directly on the display, the trace is displayed directly on the screen with little, if any, intermediary processing. The combined device results in a touch display utilizing MRAM cells as the registering means or location sensing means.

In an alternative embodiment, the styli are laser pointers that interact with an image projected on a big screen. The styli movement is captured by a camera that maps the screen for location of styli interaction and activity. The styli are limited in the area in which they operate relative to one another because of the natural limit of structure of the hand and the placement of the pointing devices thereon. Further, since the MRAM array serves as an addressable memory array, this simplifies the drive electronics typically required in prior art systems. Additionally, the displayed image/graphics or otherwise defined information can be stored in a non-volatile fashion due to the nature of the MRAM cells as previously described. Since the MRAM cells retain the last selected orientation of the memory bits indefinitely, when the display system is turned off and then turned on again, no loss of information occurs. The display acts as a writable and reusable paper medium rather than as a conventional digitizer tablet that always required saving of data to a long-term memory store rather than directly within the digitizer itself.

The MRAM cells may be implemented using in one embodiment, thin-film transistor (TFT) cells. Alternative display cells may also be utilized, which may include tunneling magneto-resistive (TMR) effect. Others also cells based on magneto-resistive (MR) effect, giant magneto-resistive (GMR) effect, magnetic tunneling junction (MTJ) effect, or colossal magneto-resistive (CMR) effect.

There are four very different physical effects that produce MR of different types: AMR (anisotropic), GMR (giant), TMR (tunneling) and CMR (colossal). Tunneling Magneto-resistance (TMR) or the tunneling magneto-resistive effect (TMR effect) is the change in resistance generated by the physical effect of spin-dependent tunneling (SDT) that is seen in a magnetic tunnel junction (MTJ, also sometimes called an SDT junction).

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An input system for use on a user's hand, comprising:
    a first stylus and a second stylus, the first stylus assigned to a first finger of the user's hand and the second stylus assigned to a second finger of the user's hand, each stylus capable of generating an output signal based on a user input action;
    location control logic, coupled to the first stylus and the second stylus, to identify each stylus based on the finger position assigned on the user's hand relative to the other fingers of the user's hand; and communications logic, coupled to the location control logic, to send the signals generated by the styli to a computer system.

2. The invention according to claim 1 further comprising a third stylus, assigned to a third finger of the user's hand and wherein the location control logic identifies the third stylus based on its finger position.

3. The invention according to claim 2 further comprising a fourth stylus, assigned to a fourth finger of the user's hand and wherein the location control logic identifies the third stylus based on its finger position.

4. The invention according to claim 3 further comprising a fifth stylus, assigned to a fifth finger of the user's hand and wherein the location control logic identifies the third stylus based on its finger position.

5. The invention according to claim 1 further comprising a third stylus and fourth stylus, the third stylus assigned to a first finger of the user's other hand and the fourth stylus assigned to a second finger of the user's other hand and wherein the location control logic identifies the third stylus and fourth stylus based on its hand position and finger position.

6. A data input system comprising:

an input stylus for use on a user's hand, the input stylus comprising a first stylus and a second stylus, the first stylus assigned to a first finger of the user's hand and the second stylus assigned to a second finger of the user's hand;

a digitizer tablet that detects movement of the first and second styli and converts the movement into signals for output; and control logic, coupled to the first stylus and the second stylus, to identify each stylus based on the finger position assigned on the user's hand relative to the other fingers of the user's hand and to process the signals generated by the digitizer tablet.

7. The data input system according to claim 6 wherein the digitizer tablet comprises an MRAM-array based digitizer tablet.

8. The invention according to claim 6 further comprising a third stylus, assigned to a third finger of the user's hand and wherein the location control logic identifies the third stylus based on its finger position.

9. The invention according to claim 8 further comprising a fourth stylus, assigned to a fourth finger of the user's hand and wherein the location control logic identifies the third stylus based on its finger position.

10. The invention according to claim 9 further comprising a fifth stylus, assigned to a fifth finger of the user's hand and wherein the location control logic identifies the third stylus based on its finger position.

11. The invention according to claim 6 further comprising a third stylus and fourth stylus, the third stylus assigned to a first finger of the user's other hand and the fourth stylus assigned to a second finger of the user's other hand and wherein the location control logic identifies the third stylus and fourth stylus based on its hand position and finger position.

12. A digitizing input system for use by a user, comprising:

a first stylus and a second stylus, the first stylus assigned to a first finger of the user and the second stylus assigned to a second finger of the user, each stylus capable of generating an output signal based on a user input action;

location control logic, coupled to the first stylus and the second stylus, to identify each stylus based on the finger position assigned to the first and second styli and constrain operation of each stylus based on its position relative to the other stylus; and communications logic, coupled to the location control logic, to send the signals generated by the styli to a computer system.

13. The invention according to claim 12 further comprising a third stylus, assigned to a third finger of the user wherein the location control logic identifies the third stylus based on its position relative to the first or second stylus.

14. The invention according to claim 13 further comprising a fourth stylus, assigned to a fourth finger of the user wherein the location control logic identifies the fourth stylus based on its position relative to the other styli.

15. The invention according to claim 14 further comprising a fifth stylus, assigned to a fifth finger of the user wherein the location control logic identifies the fifth stylus based on its finger position.

16. The invention according to claim 12 wherein the first stylus is on a first hand and the second stylus is on a second hand and the location control logic identifies which stylus is on which hand.

17. A data input system comprising:

an input device for use by a user, the input device comprising a first stylus and a second stylus, the first stylus assigned a first region of operation and the second stylus assigned to a second region of operation relative to the first stylus;

a digitizer tablet that detects movement of the first and second styli within their operating regions and converts the movement into signals for output; and control logic, coupled to the first stylus and the second stylus, to identify each stylus based on it operating region relative to the action of the user and to process the signals generated by the digitizer tablet.

18. The data input system according to claim 17 wherein the digitizer tablet comprises an MRAM-array based digitizer tablet.

19. The invention according to claim 17 wherein the first stylus overlaps the operating region of the second stylus.

20. The invention according to claim 17 further comprising a display coupled to the digitizer tablet and coplanar therewith such that the styli interact with the display and digitizer tablet.

21. The invention according to claim 20 wherein the digitizer tablet is a touchpad screen.

* * * * *